(12) United States Patent
Dusterhoft et al.

(10) Patent No.: US 10,621,500 B2
(45) Date of Patent: Apr. 14, 2020

(54) COMPLETION DESIGN OPTIMIZATION USING MACHINE LEARNING AND BIG DATA SOLUTIONS

(71) Applicant: Halliburton Energy Services, Inc., Houston, TX (US)

(72) Inventors: Ronald Glen Dusterhoft, Katy, TX (US); Harold Grayson Walters, Tomball, TX (US); Jeffrey Marc Yarus, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 793 days.

(21) Appl. No.: 14/873,538

(22) Filed: Oct. 2, 2015

(65) Prior Publication Data
US 2017/0096881 A1    Apr. 6, 2017

(51) Int. Cl.
*G06N 20/00*    (2019.01)
*E21B 43/26*    (2006.01)
(Continued)

(52) U.S. Cl.
CPC ........ *G06N 7/005* (2013.01); *E21B 43/126* (2013.01); *G06N 20/00* (2019.01)

(58) Field of Classification Search
CPC .... G01V 2210/62; G06N 7/005; G06N 20/00; E21B 43/26
See application file for complete search history.

(56) References Cited

U.S. PATENT DOCUMENTS

| | | | | |
|---|---|---|---|---|
| 6,002,985 | A | * | 12/1999 | Stephenson ............. E21B 43/00 702/13 |
| 7,574,410 | B2 | * | 8/2009 | Strack .................... G01V 3/083 706/21 |

(Continued)

OTHER PUBLICATIONS

Moeinikia et al., Experimental Design in Reservoir Simulation: An Integrated Solution for Uncertainty Analysis, a Case Study (May 2012), Journal of Petroleum Exploration and Production Technology, vol. 2 Issue 2, pp. 75-83, available at https://link.springer.com/article/10.1007/s13202-012-0023-0 (Year: 2012).*

(Continued)

*Primary Examiner* — Kamran Afshar
*Assistant Examiner* — Ying Yu Chen
(74) *Attorney, Agent, or Firm* — John W. Wustenberg; Baker Botts L.L.P.

(57) ABSTRACT

Systems and methods for generating and storing completion design models in a central data repository of models for completion design, well bore (such as fracturing or drilling) or other operations is shown. In one embodiment, the methods comprise identifying parameters of a hydraulic fracturing operation within a subterranean formation; generating a completion design model based on the parameters of the hydraulic fracturing operation; storing the completion design model in a central data repository of models; generating the central data repository of models; wherein the data repository is based on previously generated models for one or more other subterranean formations having varying levels of uncertainty for expected output; reducing the level of uncertainty for the expected output based on completion parameters, wherein the completion parameters are used to update the central data repository of models; accessing the central data repository of models to predict results expected for a data set based at least in part on the central data repository of models, wherein the results comprise a pre-
(Continued)

400 ⟶

| 401 | 402 | 403 | 404 | 405 |
|---|---|---|---|---|
| Location | Permeability | Fracture Closure | Resistivity | Init. Production |
| $X_1/Y_1/Z_1$ | $r_{11}/\phi_{11}$ | $r_{21}/\phi_{21}$ | $r_{31}/\phi_{31}$ | $r_{41}/\phi_{41}$ |
| $X_2/Y_2/Z_2$ | $r_{12}/\phi_{12}$ | $r_{22}/\phi_{22}$ | $r_{32}/\phi_{32}$ | $r_{42}/\phi_{42}$ |
| $X_n/Y_n/Z_n$ | $r_{1n}/\phi_{1n}$ | $r_{2n}/\phi_{2n}$ | $r_{3n}/\phi_{3n}$ | $r_{4n}/\phi_{4n}$ |

480 ⟶ diction as to a level of output for the dataset, further wherein the prediction comparison results in an identification of the optimized completion design for the dataset.

21 Claims, 4 Drawing Sheets

(51) Int. Cl.
*G06N 7/00* (2006.01)
*E21B 43/12* (2006.01)

(56) References Cited

U.S. PATENT DOCUMENTS

| | | | |
|---|---|---|---|
| 2009/0119082 A1* | 5/2009 | Fitzpatrick | E21B 49/00 703/10 |
| 2013/0096900 A1* | 4/2013 | Usadi | G06F 17/5018 703/10 |
| 2014/0067353 A1* | 3/2014 | Shelley | G06N 3/0427 703/10 |

OTHER PUBLICATIONS

Justin Sears, "Modern Oil & Gas Architectures Built with Hadoop", Mar. 6, 2014, Hortonworks, https://hortonworks.com/blog/modern-oil-gas-architectures-built-hadoop/ , pp. 1-6. (Year: 2014).*

* cited by examiner

| | Location | Permeability | Fracture Closure | Resistivity | Init. Production |
|---|---|---|---|---|---|
| | 401 | 402 | 403 | 404 | 405 |
| | $X_1/Y_1/Z_1$ | $r_{11}/\phi_{11}$ | $r_{21}/\phi_{21}$ | $r_{31}/\phi_{31}$ | $r_{41}/\phi_{41}$ |
| | $X_2/Y_2/Z_2$ | $r_{12}/\phi_{12}$ | $r_{22}/\phi_{22}$ | $r_{32}/\phi_{32}$ | $r_{42}/\phi_{42}$ |
| | $X_n/Y_n/Z_n$ | $r_{1n}/\phi_{1n}$ | $r_{2n}/\phi_{2n}$ | $r_{3n}/\phi_{3n}$ | $r_{4n}/\phi_{4n}$ |

400

480 450 $r_{11}/\phi_{11}$:$x_1/y_1/z_1$; $r_{12}/\phi_{12}$:$x_2/y_2/z_2$; $r_{1n}/\phi_{1n}$:$x_n/y_n/z_n$ 452  453/403  454/404  455/405

COMPLETION DESIGN OPTIMIZATION USING MACHINE LEARNING AND BIG DATA SOLUTIONS

BACKGROUND

The present disclosure relates generally to wellbore and completion design operations and, more particularly, to data storage, modeling, and design for well planning, drilling, and completion operations.

Hydrocarbons, such as oil and gas, are produced from subterranean reservoir formations that may be located onshore or offshore. The processes involved in recovering hydrocarbons from a reservoir are becoming increasingly complex. Subterranean production is a highly expensive and extensive endeavor and the industry generally relies heavily upon educated predictions of reservoir conditions to characterize the reservoir prior to making substantial investments to optimize well placement within the reservoir, optimize production of hydrocarbons, and performing the necessary steps to produce, process and transport the hydrocarbons from the reservoir.

Planning for and performing the production steps generally requires the manipulation of large amount of information and generation of design and uncertainty modeling tasks. Simulators that predict the manner for developing a design or modeling of reservoirs are separately maintained such that no information is traditionally shared between individual simulations associated with a particular reservoir analysis. For example, planning for a drilling operation may include retrieving information from a relational database and generating relational models that represent the characteristics of the subterranean formation to use to base the wellbore and completion design. These simulations can provide an output with an uncertainty for various manners of design and can be utilized by reservoir engineers to make a number of observations and predictions about, for example, the multi-phase flow of oil, gas, and water in a subterranean reservoir. Engineers can further simulate various wellbore and completion designs based on the various uncertainty models to determine one or more improved or optimal location and design of the wellbore to optimize the recoveries of such resources. These are not the only types of parameters taken into account in building a completion design.

Other completion design may factor in Geo-mechanical technologies that characterize rock properties to predict the state of earth stresses and natural fractures and or faults in a formation.

These simulations can be computationally intensive and yield results with certain uncertainty (typically referred to as uncertainty models). But once a completion design has been selected, typically, this information is not shared outside of the individual design which prevents expanding the field of knowledge for completions design technology uniformly across a broader set.

Similarly, measurements may be generated during the drilling operation and used to augment the relational model. The generated measurements may also be stored in the relational database for use at a later time.

Typical relational databases and models are complex and difficult to generalize to multiple reservoirs and often only contain select information making it necessary to access information from multiple sources. For instance, the data within the relational database is generally tied to gridded reservoir volumes within the formation in which the data was generated. The relational models are generated from this data, making it difficult to generalize the data outside of the formation in which it was generated. In many instances, this means that complex analytical and design solutions must be generated from scratch each time they are run, which is inefficient with respect to both labor and computational resources.

In uncertainty modeling, an engineer, may generate hundreds of simulation models that result in various output. The engineer may then select a particular simulation model or set of models in designing the completion design and operation. However, the simulations and results are generally stored locally by the engineer and are inaccessible and unusable in any subsequent well design. Moreover, such simulations have no readily available method of post-completion testing, by allowing for a set of resulting parameters to match up to the original simulation model to determine the relationship between the simulation and actual operation of a design.

BRIEF DESCRIPTION OF THE DRAWING(S)

Some specific exemplary embodiments of the disclosure may be understood by referring, in part, to the following description and the accompanying drawings.

Figure 1:
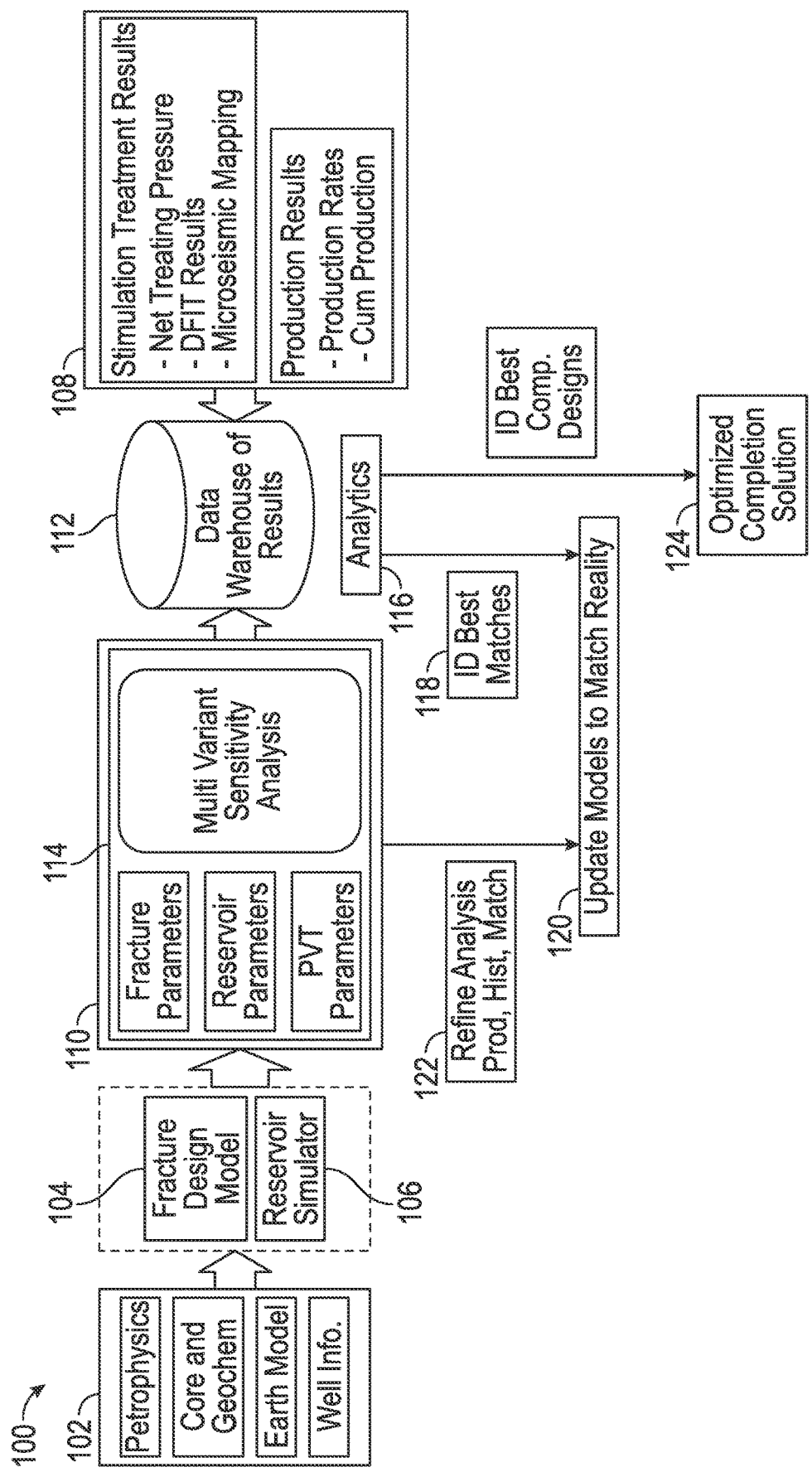
FIG. 1 is a diagram of an example design, calibration, and completion workflow, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical, electromagnetic, or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

In one embodiment, the disclosure herein is applicable to develop an improved completion design for a reservoir operation. Data from multiple sources can be sent to a data warehouse for central housing and analysis. The output from the simulation model can also be used to do analytics for further analysis. For example, when a set of parameters are available for a well, an engineer can perform analytics by generating various queries and match the resulting values.

In another embodiment, actual production data resulting from the completed well design and build can be used to self-validate the simulation models generated and stored at the central repository. With the implementation, an engineer could identify rapidly which simulation design would give an optimized production. The results can be further calibrated based on the simulation models. The well-design can be further optimized based on predictive tools and production data.

Because the central repository may take simulation models from a multitude of sources and self-validate the simulation designs, engineers can identify statistics based models to predict efficiently and rapidly. In another embodiment, simulations may not need to be run to identify the optimized well-design. This could further be used to determine physics based models.

Uncertainly based models could take days to run but with the present invention, a central repository could be used to immediately and instantly identify the optimized completion solution for a set of parameters.

By linking the input and output and relating the data back to physics based models, a self-validation may occur to determine the optimized solution for a set of parameters at a multitude of depths. Data could be further fed back in to generate improved and optimized design solutions.

Once the statistical models reach a sufficient degree of efficiency and results, those models can be run in various client offices using remote applications to the data warehouse. Prior to the disclosure herein, in statistical models, an engineer look to measures in the field. For example, one such measurement may be that if more fluid is pumped at a certain level, more hydrocarbons will be produced from the subterranean formation.

With the present embodiment, the disclosure replaces physics based models with statistics based models to make the central repository a continuously growing and representative database.

With the implementation, instead of iterating to identify a potential design implementation to begin a design, an engineer can begin with a near optimal solution with a level of confidence. This would allow a central repository to have a data store that allows capturing of an engineer's years of experience and reliability in identifying solutions with a repository to use that has self-validated results to develop the optimized completion solution.

In an example implementation, the combined data repository of models, measurements, and design information can be used to improve the speed and accuracy, and reduce the computational load of a design operation for any modeling that requires a substantial simulation in design, such as a new well or completion operations, which are typically labor and computationally intensive and time-consuming. FIG. 1 is a diagram of an example design, calibration, and completion workflow 100, according to aspects of the present disclosure. In the embodiment shown, the workflow may begin with the generation of an earth model 102 that represents the formation/reservoir or the portion of interest of the formation/reservoir. The earth model 102 may comprise a numerical representation of a formation or reservoir that reflects petrophysical and core and geochemical properties of the formation and fluids within the formation/reservoir. Example properties include, but are not limited to, stress profiles, formation permeability, fluid-loss characteristics, the Young's modulus of the formation, principle stress magnitude and direction, Poisson's ratio, brittleness, porosity, fluid saturation, PVT properties, and natural fracture distribution. In certain embodiments, the earth model 102 may be generated by incorporating or otherwise extrapolating or estimating data from existing earth models that were previously generated, including earth models that are stored in a central data repository 112, as described above, as well as generating new earth models based on actual measurements within the repository.

After the earth model 102 is generated, it may be used, in part, in a completion design process. The completion design process may include the selection of one or more parameters necessary to design the completion operation. One example completion operation comprises hydraulic fracturing, in which pressurized fluids are injected into a formation to cause cracks or fractures in the formation that facilitate hydrocarbon flow into the well. In the embodiment shown, the completion design process comprises a fracture design model 104 that estimates the characteristics and parameters of the propagation of hydraulic fractures within a given formation, as well as the characteristics of the fluid to pump downhole to create the hydraulic fracture.

In some embodiments, the disclosure herein is applicable to develop an improved wellbore or completion design for a fracturing operation. Typically, at a wellbore, fracturing fluid is applied to a portion of the subterranean formation surrounding a portion of the well bore. The well bore may include horizontal, vertical, slant, curved, and other types of well bore geometries and orientations, and the fracturing treatment may be applied to a subterranean zone surrounding any portion of the well bore.

The well bore can include a casing that is cemented or otherwise secured to the well bore wall. The well bore can be uncased or include uncased sections. Perforations can be formed in the casing to allow fracturing fluids and/or other materials to flow into the subterranean formation. In cased wells, perforations can be formed using shape charges, a perforating gun, hydro-jetting and/or other tools.

The well can have a work string into the well bore 104. A system that pumps fracturing fluid can be coupled to the well bore through the work string. The working string may include coiled tubing, jointed pipe, and/or other structures that allow fluid to flow into the well bore. The working string may include ports that are spaced apart from the well bore wall to communicate the fracturing fluid into an annulus in the well bore between the working string and the well bore wall.

The fracturing operation thus involves several parts and resources that can be improved by using the present invention. For example, the present disclosure can be used to simulate a fracturing operation at the well bore. The fracturing operation can include a number of characteristics and variables, each of which (or a subset) can be included within the software and saved for reference as disclosed herein. Thereafter, for a particular fracturing operation, a user can insert those characteristics of the well bore to generate a simulation or simulations of fracturing operations for optimal assessment of the operation for the well bore.

Once the parameters and characteristics of the formation and fractures are respectively modeled and estimated in the earth model 102 and fracture design model 104, those parameters and characteristics may be incorporated into a reservoir simulator 106. The reservoir simulator may, for instance, simulate the completion operation to determine its effectiveness at fracturing the formation, as well as simulate the resulting production from the formation due to the fracturing operation. In the embodiment shown, the results of the reservoir simulation 108 as well as the parameters 110 used within the reservoir simulator may be stored in a central repository 112. Example parameters 110 include, but are not limited to, fracture parameters, reservoir parameters, and pressure, volume, and temperature parameters. The central repository 112 may also include parameters and results generated through previous design operations on different wells across many different formations and reservoirs. This will allow the central repository 112 to house parameters and results generated through previous design operations for all past operations, making these usable in further analysis and design.

In order to improve the resulting completion operation, sensitivity analyses 114 may be run to evaluate uncertainties in the estimated variables, such as formation permeability and drainage area, formation stress, fracture propagation, etc. In certain instances, analytical analysis 116 may be run on data within the central repository 112 to find the optimal match 118 or reasonable group of responses for the values of the estimated variables. The values of the parameters 110 may then be changed to reflect to best match 118 values at 120, and the simulation re-run. The new simulation results and parameters may again be saved to the central repository 112, and the sensitivity analyses 114 may be re-run to evaluate uncertainties. This process may continue until the uncertainties within the simulated data are within an acceptable tolerance range, at which point, the optimized completion solution 124 may be reached.

Once well performance can be captured based on the implementation of the completion solution 124, the data resulting from the well performance can be used to validate and enable the modelled results to be compared to the actual output. This will enable self-validation of the generated models to verify the quality of the predictions, which can then be updated in the central repository for further use and analysis.

When the parameters and results generated through previous design operations on different wells are included together in a single repository, the design process may leverage those measurements to better predict the optimized parameters and solution. Specifically, rather than running numerical or analytical analysis on the simulation results and parameters of a single well, the analysis can be run on the simulation data from hundreds or even thousands of design operations, improving the initial best match determination and reducing the number of iterations needed to reach the optimized solution. This can be further used to determine the quality of the match or determine a degree of confidence that the optimized solution will result in improved output of the subterranean formation. Notably, the central repository can, but is not required to store data in the point and vector format described below for the design and simulation data from multiple wells to be stored in a single repository where it can be easily accessible for multiple design operations.

Figure 2:
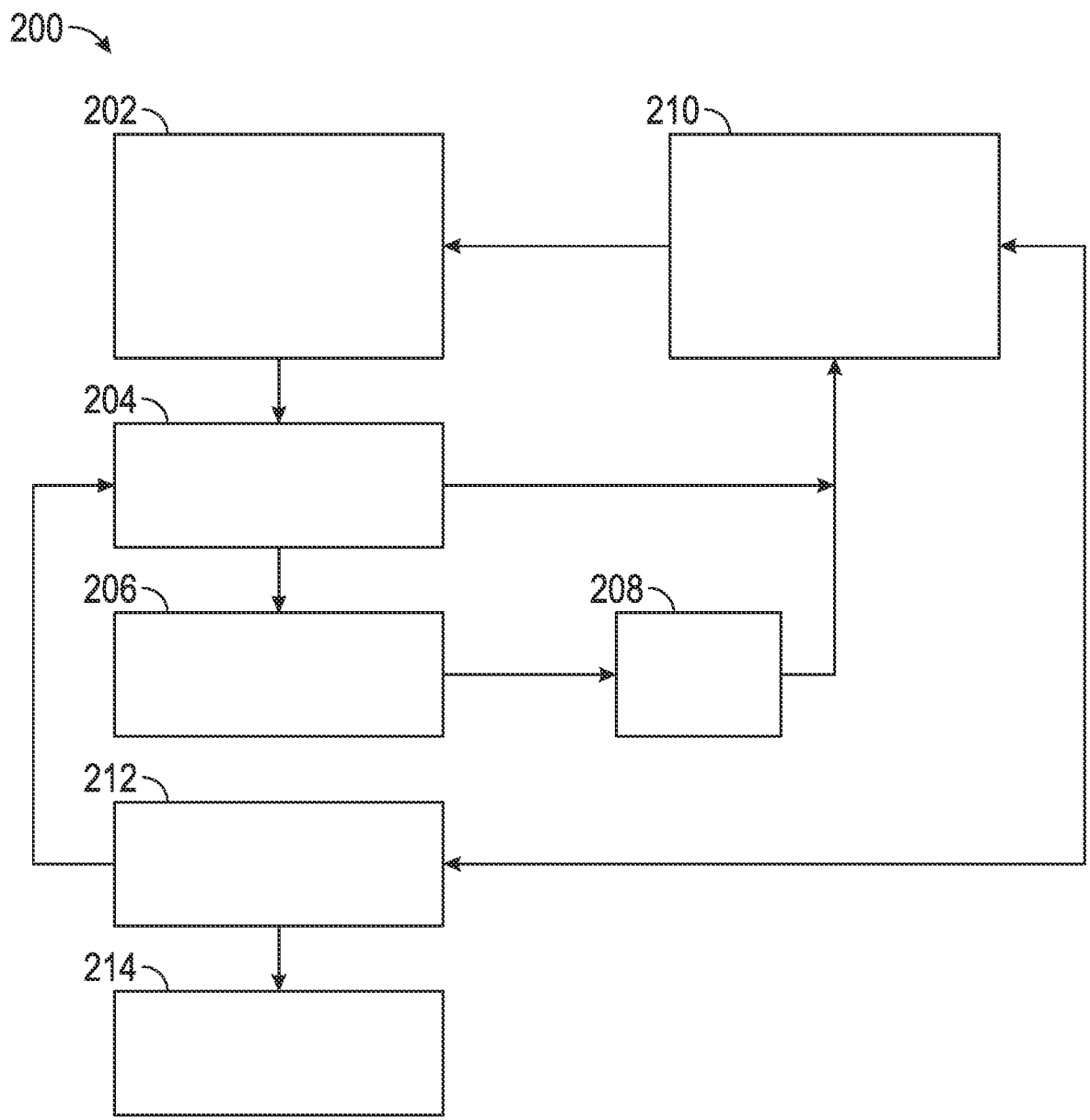
FIG. 2 is an example flow diagram illustrating an example at least partially automated design process, according to aspects of the present disclosure.

In certain embodiments, the central data repository can be further leveraged to at least partially automate the design process. Specifically, one or more machine learning algorithms may use the design and simulation data as well as the actual measurements and model predictions within the repository to provide a starting point for design operations, thereby providing a simpler and faster way to complete a design process directly from mathematical models. FIG. 2 is an example flow diagram illustrating an example at least partially automated design process, according to aspects of the present disclosure. At step 200, a user may input one or more parameters into a design tool 202. The parameters may include, for example, the type of formation, or the location of the formation of interest. The design tool may receive the input 202 and output suggested design and formation/reservoir parameters 204. Those parameters may be used in a reservoir simulator 206, as described above, to produce simulation results 208, with the suggested parameters 204 and the simulation results 208 being stored in a central repository 210. Analytic analysis 212 may be run to improve the suggested parameter values and reduce the uncertainty in the models, with the process being iteratively repeated until an optimized design solution 214 is output, similar to the process described above with respect to FIG. 1.

In the embodiment shown, the design tool 202 may include or result from one or more machine learning algorithms. Example machine learning algorithms include, but are not limited to, decision trees, artificial neural networks, support vector machines, and Bayesian networks. In certain embodiments, the machine learning algorithm may receive both actual measurements, modeled and design parameters, and simulation results and measured post treatment performance from the repository 210, which may but are not required to be stored in the repository 210 in a point and vector format. The machine learning algorithm may, for instance, compare the actual measurements to the modeled parameters to generate new, more accurate models. These models may be used as a basis from which a user may work when inputting the parameters 200, or a model may be selected by the design tool 202 for the user based on the parameters 200. Similarly, the machine learning algorithm may compare actual measurements of the simulation and completion results within the repository 210 to improve the reservoir simulation and reduce the uncertainty of the variables used within the reservoir simulation. Based on the above, in certain embodiments, the design tool 202 may suggest certain design parameters with relatively lower uncertainties as a starting point of the iterative process. This may reduce the number of iterations needed to find an optimum solution, which saves time and computing resources. Additionally, the parameters suggested by the design tool may improve over time due to the suggested parameters being stored in the database with the other data, such that the machine learning algorithm may further improve the accuracy of the models over time. In certain cases, the improved modeling by the machine learning algorithm may result in initial suggested parameters that provide optimum or near-optimum solutions such that the iterative process can be avoided entirely.

Based upon the quality and variance in the stored data, results from the machine learning solutions may be presented with a degree of confidence allowing the engineer to assess if additional computational runs are needed or not.

Measurements may be generated before, during, and/or after the drilling, completion, or production operation. Examples include, but are not limited to, seismic measurements of the formation, measurements related to the physical or chemical composition of fluids trapped within the formation or the drilling/completion fluids used during the drilling/completion operation, measurements related to the physical or chemical composition of the formation itself, and many other measurements that would be appreciated by one of ordinary skill in the art in view of this disclosure. These measurements may be stored and processed locally, such as at a computing facility or control unit, and also may be communicated to a central data repository for storage.

Typically, these measurements, either in raw or processed form, would be stored in a central data repository in relational databases in which the measurements are associated with the reservoir volume to which the measurement corresponds. The reservoir volumes represent three-dimensional subsets of a grid overlaid on the formation. Models of the formation are typically generated with reference to this grid. Due to the localized nature of the grid and reservoir volume, however, it can be computationally prohibitive to generalize the measurements outside of the portion of the formation to which the measurements correspond. This limits the ability to perform reservoir-wide or wider modeling that can be useful for planning drilling operations.

Column-oriented databases that can be used as part of the embodiments of the present disclosure, for illustrative purposes only, include for example Hadoop HBase or Cassandra, both developed by Apache. Such open source distributed databases are well-suited as part of the framework to implement a database structure for the present invention. Nonetheless, a person of ordinary skill in the art would understand that any non-relational distributed type of database can be used to implement the database to use to implement the point and vector model herein. Moreover, Apache Hadoop as a platform in general is one example of a framework that can be used to implement the bid data approach described herein. These types of column oriented databases, because they essentially consist of gigantic sparse tables, are well-suited to implement the disclosures described herein.

According to aspects of the present disclosure, rather than a grid model stored in a relational database, the raw or processed measurements and calculated parameters may be represented using a point and vector model in a column-oriented database. As will be described in detail below, the point and vector model and column-oriented database may facilitate data aggregation and analytics, as well as significantly reduce the computational complexity of extrapolating reservoir-wide or area-wide parameters and properties from the data. For instance, in certain embodiments, a reservoir-wide or even world-wide data model can be generated from point and vector entries in a column-oriented database, from which formation properties can be extrapolated. These properties may include, but are not limited to, petrophysical properties, reservoir properties, geochemistry, reservoir fluid properties, mechanical rock properties, production values, rock stresses and other properties for which measurements or data may be stored within the column-oriented database.

Figures 3, 4:
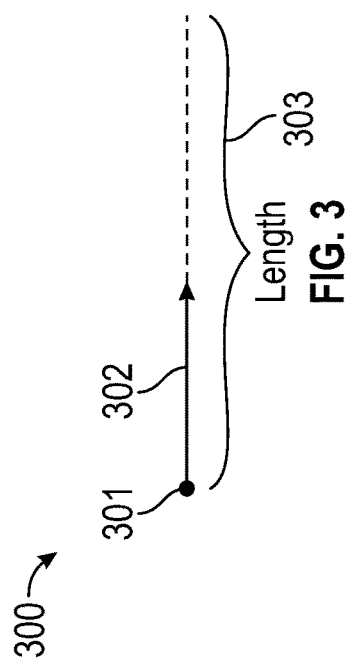
FIG. 3 is a diagram illustrating an example point and vector representation of a data point in a volume of interest, according to aspects of the present disclosure.
FIG. 4 is a diagram illustrating an example table containing point and vector entries for downhole measurements, and an example column-oriented storage scheme for the table, according to aspects of the present disclosure.

FIG. 3 is a diagram illustrating an example point and vector representation of a geological property data point in a volume of interest, such as a formation, according to aspects of the present disclosure. In the embodiment shown, the vector 300 comprises a location, a magnitude, a direction, and a length. The location corresponds to point 301, which may correspond to the physical location to which the data point represented by the vector 300 is associated. For example, in a logging environment during a drilling operation, a logging tool may generate a measurement at a certain depth and location within a borehole. The point 301 may correspond to a specific location or an area from which the measurement was taken or derived. Notably, the point 301 may be associated with more than one vector, to the extent other geological property data points are associated with that location.

The magnitude and direction of the vector 300 are identified by the arrow 302. In certain embodiments, the magnitude of the vector 300 may correspond to the magnitude of the data point represented by the vector 300 (e.g., the geological property in the neighborhood of the location of the point 301), and the direction of the arrow may correspond to the direction of maximum continuity—the direction in which the magnitude of the geological property stays substantially the same for the greatest distance. In this context, substantially the same may mean, for example, within 10 percent, although other meanings are possible depending on the circumstances and the geological property represented by the vector 300. The length 303 may correspond to the distance through the volume-of-interest from the point 301 in the direction of the vector that the point direction of maximum continuity stays substantially the same.

The values of the vectors may be derived from disparate data sources, including the raw and processed measurements described with respect to FIGS. 1 and 2. To the extent not already discussed with reference to FIGS. 1 and 2, the data sources can include, but are not limited to, seismic measurements, log files, well paths, microseismic measurements, physics-based-models, and statistics-based-models. Generally, the model-based data may be stored in a substantially similar way to the experimental-based data. This allows for uniformity in the storage of the data, as will be described below, and flexibility to expand the data associated with a given location in order to provide analytical solutions and models based on extrapolations from both the experimental and model based data. Existing data storage typically either stores the experimental and model based data separately and/or in different formats so that combined analytics are computationally difficult.

In certain embodiments, the vector 300 may be represented based, at least in part, on the location of the point 301 and the characteristics of the arrow 302. For example, the point 301 may be identified based, at least in part, on its location within a single coordinate reference system (CRS). In certain embodiments, the single CRS may comprise a geographic coordinate system that identifies a location based on its latitude and longitude on the surface of the Earth, as well as its depth under the surface at that latitude and longitude. The coordinates of the point 301 within the CRS may be measured directly, or calculated and extrapolated from indirect sources. For example, the latitude and longitude of the drilling rig may be known based on a global positioning system at the rig site, and the orientation of the point with respect to the drilling rig may be known from downhole sensors (e.g., accelerometers, magnetometers, etc.) that track the location of the measurement equipment. By combining the absolute position of the drilling rig and the relative position of the measurement equipment when the relevant measurements are taken, the absolute position of the point may be determined.

The arrow 302 may be represented, for example, in polar or rectangular coordinates. Polar coordinates, for instance, may express the magnitude and direction of the arrows 302 in terms of a radial coordinate r and an angular coordinate $\varphi$ with respect to the point 301, respectively. To the extent the direction of the arrow 302 is unknown, the angular coordinate may be left blank, providing flexibility where the data set is incomplete. Rectangular coordinates for the arrow 302 may be expressed in two or three coordinates, for instance, with respect to the point 301.

FIG. 4 is a diagram illustrating an example table 400 containing point and vector entries for downhole measurements, and an example column-oriented storage scheme 480 for the table 400, according to aspects of the present disclosure. In the embodiment shown, each row of the table 400 corresponds to measurements associated with a particular point. The associated point may be identified in the first column 401 by its CRS coordinates. In the embodiment shown, the CRS coordinates for each point are represented in the form $x_n/y_n/z_n$, where $x_n$ corresponds to the latitude of the $n^{th}$ point, $y_n$ corresponds to the longitude of the $n^{th}$ point, and $z_n$ corresponds to the depth of the $n^{th}$ point below the surface of the Earth at that $x_n$ and $y_n$ coordinate. It should be appreciated that different points may contain similar values for the latitude, longitude, and depth coordinates based on the location of the point, and that the $x_n$ latitude value is not necessarily different than the $x_{n+1}$ latitude value, for instance.

Each column in the table 400 may correspond to a different type of measurement or value. In the embodiment shown, column 402 corresponds to "Permeability" measurements or values, column 403 corresponds to "Fracture Closure Pressure" measurements or values, column 404 corresponds to "Resistivity" measurements or values, and column 405 corresponds to "90 Day Initial Production" measurements or values. Each entry in a particular column may comprise the polar coordinates of an arrow representing the corresponding measurement or value in the form $r/\varphi$ at the point represented in the corresponding row of column 401. For instance, $r_{11}/\varphi_{11}$ corresponds to the polar coordinates for the arrow representing permeability measurements at point $x_1/y_1/z_1$. Similarly, $r_{3n}/\varphi_{3n}$ corresponds to the polar coordinates for the arrow representing resistivity measurements at point $x_n/y_n/z_n$. To the extent the data entries in a particular column are incomplete—e.g., each point does not have an associated measurement of the type represented in the column, or the associated measurement for a point in incomplete—certain cells or portions of cells may be left blank or otherwise marked as empty.

According to aspects of the present disclosure, the table 400 may be represented in a column-oriented database via a column-oriented storage scheme 480. As used herein, a column-oriented database may be characterized, in part, by the way in which the data from a table is stored on storage media, such as hard disks and other electromagnetic storage devices. In the embodiment shown, each entry in the column 402 is appended with a "primary key" and stored sequentially within a data block 450. An example primary key 452 comprises the CRS coordinates of the point to which the column entry corresponds, although primary keys are not required and other types of primary keys are possible. The data block 450 may be stored on a storage media, such as a hard drive, with a pointer to the beginning of the block 450 stored in an index. In certain embodiments, each subsequent column of data may be similarly appended and sequentially stored in a separate data block. Here, data block 453 corresponds to column 403, data block 454 corresponds to column 404, and data block 455 corresponds to column 405. Notably, the data blocks 450-455 may be stored sequentially within a storage medium, such that only one memory pointer need be maintained, or on separate storage medium, such that a memory pointer for each block is maintained. When columns are added to the table, additional data block may be added in sequence with the existing data blocks, or stored separately with an associated pointer.

As can be seen, once appended with a primary key in the form of the corresponding point's CRS coordinates, each column entry in a given data block will contain both the point and vector data for the corresponding measurement. This data configuration may facilitate easier and faster data computations for analytical database calculations. For instance, if the database user has a query regarding Permeability measurements within a particular formation, only the data block 450 needs to be read from the storage medium, and certain entries may be excluded based on the CRS coordinates of the measurement, without another data block having to be read from the storage media. This is in contrast to a typical row-oriented database, where every row of information would have to be read from the storage medium to identify the relevant Permeability measurements.

The point and vector column-oriented database approach may also facilitate data extrapolation across basin-wide, region-wide, or world-wide areas using measurements and values from various operations and computer modeling. As stated above, the point and vector column-oriented database approach may allow for all of the measurements from remote, unrelated operations and computer modeling to be stored together in a common format, without the need for gridding on other limitations that make combining various measurements computationally difficult. The common format may reduce the computational load needed to perform data analytics and extrapolate information of interest. For example, a user may be interested in modeling or otherwise visualizing measurement values across an entire basin. In those instances, the coordinate boundary of the basin may be determined and used to exclude data entries from outside of the basin of interest. This may include, for example, comparing the x, y, and/or z coordinates of the primary keys with a range of x, y, and/or z coordinates that contain the basin. The basin may then be subdivided into areas or bins based on the CRS coordinates, and the measurements within the database may be associated with a particular bin if the CRS coordinate for that measurement falls within a range of CRS coordinates associated with that bin. The measurements within each bin can then be processed, e.g., to determine an average value for the measurements, and the processed measurements visualized or otherwise used to identify characteristics of interest in the formation. Notably, similar steps may be performed on smaller (e.g., a single formation or layers of depth within a formation) or larger scales (e.g., multiple basins within a region), depending on the particular application.

Figure 5:
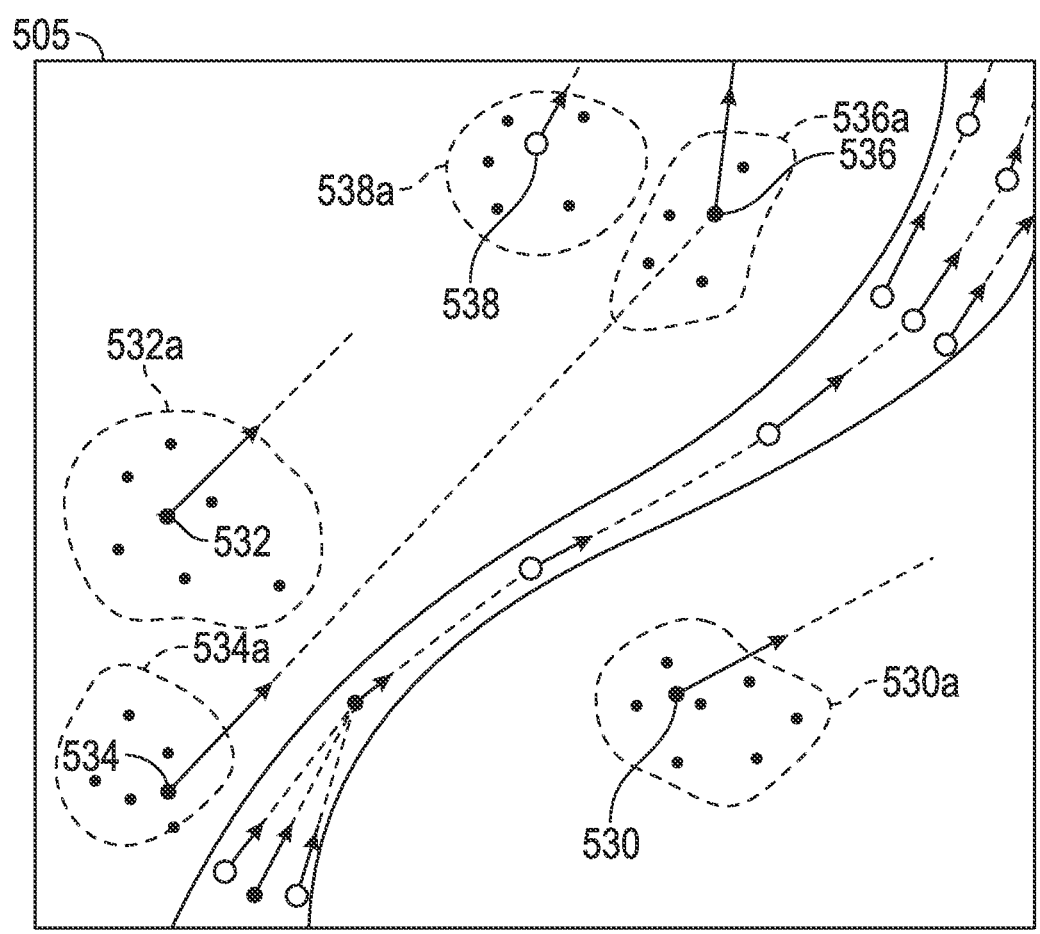
FIG. 5 is an example formation model, according to aspects of the present disclosure.

FIG. 5 is an example formation model generated using steps similar to those described above, according to aspects of the present disclosure. Specifically, an area or volume of interest 505 within a formation may be selected, and the CRS coordinates of that area or volume of interest 505 may be determined. Columns associated with parameters or measurements of interest may then be read from a storage medium, such as for example effective fracture length, width, conductivity, reservoir formation, fluid properties, proppant type, and production conditions, and entries with CRS coordinates outside of the area or volume of interest 505 may be excluded. Once the relevant data entries are identified, representative and or extrapolated points and vectors may be generated from the data entries. For instance, the number and location of points may be determined by analyzing the locations of the points within the data entries, and using one or more clustering algorithms to group the data entries into clusters. The point and vector approach can be used to generate columnar data generation. In the embodiment shown, the points 530-538 are respectively associated with clusters 530a-538a, with each of the clusters 530a-538a containing a group of points. The locations of the points 530-538 corresponding clusters 530a-538a may be determined, for example, by selecting the average location of the points with the corresponding cluster 530a-538a or performing weighted analysis based on the CRS coordinates of the points. Similarly, the vectors associated with each of the points 530-538 may be determined by averaging, weighted analysis, or other methods that would be appreciated by one of ordinary skill in the art. The other points shown in the model may be generated from similar clustering mechanisms, or may comprise individual data entries representing actual measurements or extrapolations from other modeling operations.

The result will capture predicted performance over a wide range of conditions and then identify what combination provides the best performance.

Notably, the model is represented using points and vectors of a form similar to the points and vectors used to store in the raw or processed measurements. Representing the model in this way may facilitate storage of the model results as additional data points within the column-oriented repository. Other types of models, including advanced earth models predicting the performance of a particular oil well or the results of a completion operation, as well as the actual performance of the well or completion operation and the design information used to plan the oilwell and completion operation, may be similarly stored. Locating the models and results within the repository may supplement and improve the data within the repository, as well as allow broader access to the models and results than are typically provided, such as in systems where models are generated and stored locally. Thus, rather than storing multiple projects, the simulations are stored in one place to provide access to very large volumes with the parameters. The broader access may reduce the computational load to produce subsequent models by leveraging the computational load already used to produce the earlier models for improved machine learning.

Embodiments of the present disclosure may be applicable to horizontal, vertical, deviated, or otherwise nonlinear wellbores in any type of subterranean formation, but are not limited to such embodiments. Embodiments may be applicable to injection or monitoring wells as well as production wells, including hydrocarbon wells. Embodiments may further be applicable to any project which requires a simulation for a completion design. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques for formation evaluation. Devices and methods in accordance with certain embodiments may be used in one or more of wireline (including wireline, slickline, and coiled tubing), downhole robot, MWD, and LWD operations.

In addition to implementing the present invention in an information handling system, to implement the present invention, in one embodiment, one could use server farms to store the data across multiple platforms, servers, or information handling systems. In addition to server farms, cloud computing could also be used as understood by one of skill in the art to implement the present invention.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method, comprising:

identifying parameters of a hydraulic fracturing operation within a subterranean formation;

storing one or more measurements and the parameters of the hydraulic fracturing operation using a point and vector model in a column-oriented database, wherein each row of a table of the column-oriented database corresponds to the one or more measurements associated with a particular point, wherein the particular point is identified in an associated column of the table by a corresponding coordinate reference system coordinate, wherein each column of the table corresponds to a different type of the one or more measurements, and wherein each entry in the associated column comprises polar coordinates of an arrow corresponding to the one or more measurements at the particular point represented in a corresponding row of the associated column;

generating a completion design model based on the stored parameters and the stored one or more measurements of the hydraulic fracturing operation;

storing the completion design model in a central data repository of models;

generating the central data repository of models, wherein the central data repository is based on previously generated models for one or more other subterranean formations having varying levels of uncertainty for an expected output;

reducing at least one of the varying levels of uncertainty for the expected output based on completion parameters, wherein the completion parameters are used to update the central data repository of models; and accessing the central data repository of models to predict results expected for a data set based at least in part on the completion parameters and on the previously generated models, wherein the results comprise a prediction as to a level of output for the dataset, further wherein the prediction results in an identification of an optimized completion design for the dataset.

2. The method of claim 1, further comprising generating at least one earth model, wherein generating a completion design model comprises receiving at a machine learning algorithm the at least one earth model and at least one set of measurements stored within the central data repository.

3. The method of claim 2, wherein generating the at least one earth model comprises receiving from the machine learning algorithm at least one earth model generated, at least in part, from a user's input parameters to the machine learning algorithm.

4. The method of claim 1, further comprising generating completion characteristics, wherein the completion characteristics are used at least in part for the optimized completion design for the dataset.

5. The method of claim 1, wherein generating the completion design model comprises receiving at a machine learning algorithm at least one fracture design model and at least one set of measurements stored within the central data repository.

6. The method of claim 5, wherein generating the fracture design model comprises receiving from the machine learning algorithm the fracture design model generated, at least in part, from a user's input parameters to the machine learning algorithm.

7. The method of claim 1, wherein the identification of the optimized completion design comprises:

performing an uncertainty analysis with respect to the parameters of the subterranean formation and the parameters of the hydraulic fracturing operation based, at least in part, on parameters stored within the central data repository;

determining a new value for at least one of the parameters of the subterranean formation and the parameters of the hydraulic fracturing operation based, at least in part, on the uncertainty analysis; and simulating the hydraulic fracturing operation and fluid production from the subterranean formation following the hydraulic fracturing operation using the new value.

8. A non-transitory computer readable medium comprising a set of instructions that, when executed by a processor, cause the processor to perform the steps of identifying parameters of a hydraulic fracturing operation within a subterranean formation;

storing one or more measurements and the parameters of the hydraulic fracturing operation using a point and vector model in a column-oriented database, wherein each row of a table of the column-oriented database corresponds to the one or more measurements associated with a particular point, wherein the particular point is identified in an associated column of the table by a corresponding coordinate reference system coordinate, wherein each column of the table corresponds to a different type of the one or more measurements, and wherein each entry in the associated column comprises polar coordinates of an arrow corresponding to the one or more measurements at the particular point represented in a corresponding row of the associated column;

generating a completion design model based on the stored parameters and the stored one or more measurements of the hydraulic fracturing operation;

storing the completion design model in a central data repository of models;

generating the central data repository of models, wherein the central data repository is based on previously generated models for one or more other subterranean formations having varying levels of uncertainty for an expected output;

reducing at least one of the varying levels of uncertainty for the expected output based on completion parameters, wherein the completion parameters are used to update the central data repository of models; and accessing the central data repository of models to predict results expected for a data set based at least in part on the completion parameters and on the previously generated models, wherein the results comprise a prediction as to a level of output for the dataset, further wherein the prediction results in an identification of an optimized completion design for the dataset.

9. The non-transitory computer readable medium of claim 8, wherein the set of instructions, that when executed by the processor, further cause the processor to generate at least one earth model, wherein generating a completion design model comprises receiving at a machine learning algorithm the at least one earth model and at least one set of measurements stored within the central data repository.

10. The non-transitory computer readable medium of claim 9, wherein generating the at least one earth model comprises receiving from the machine learning algorithm at least one earth model generated, at least in part, from a user's input parameters to the machine learning algorithm.

11. The non-transitory computer readable medium of claim 8, wherein generating the completion design model comprises receiving at a machine learning algorithm at least one fracture design model and at least one set of measurements stored within the central data repository.

12. The non-transitory computer readable medium of claim 11, wherein generating the fracture design model comprises receiving from the machine learning algorithm the fracture design model generated, at least in part, from a user's input parameters to the machine learning algorithm.

13. The non-transitory computer readable medium of claim 8,
wherein the identification of the optimized completion design comprises
performing an uncertainty analysis with respect to the parameters of the subterranean formation and the parameters of the hydraulic fracturing operation based, at least in part, on parameters stored within the central data repository;
determining a new value for at least one of the parameters of the subterranean formation and the parameters of the hydraulic fracturing operation based, at least in part, on the uncertainty analysis; and
simulating the hydraulic fracturing operation and fluid production from the subterranean formation following the hydraulic fracturing operation using the new value.

14. A system, comprising:
a processor;
a non-transitory computer readable medium coupled to the processor and containing a set of instructions that, when executed by a processor, cause the processor to perform the steps of
identifying parameters of a hydraulic fracturing operation within a subterranean formation;
storing one or more measurements and the parameters of the hydraulic fracturing operation using a point and vector model in a column-oriented database, wherein each row of a table of the column-oriented database corresponds to the one or more measurements associated with a particular point, wherein the particular point is identified in an associated column of the table by a corresponding coordinate reference system coordinate, wherein each column of the table corresponds to a different type of the one or more measurements, and wherein each entry in the associated column comprises polar coordinates of an arrow corresponding to the one or more measurements at the particular point represented in a corresponding row of the associated column;
generating a completion design model based on the stored parameters of the hydraulic fracturing operation;
storing the completion design model in a central data repository of models;
generating the central data repository of models, wherein the central data repository is based on previously generated models for one or more other subterranean formations having varying levels of uncertainty for an expected output;
reducing at least one the varying levels of uncertainty for the expected output based on completion parameters, wherein the completion parameters are used to update the central data repository of models; and
accessing the central data repository of models to predict results expected for a data set based at least in part on the completion parameters and on the previously generated models, wherein the results comprise a prediction as to a level of output for the dataset, further wherein the prediction results in an identification of an optimized completion design for the dataset.

15. The system of claim 14, wherein the set of instructions, that when executed by the processor, further cause the processor to perform the step of generating at least one earth model, wherein generating a completion design model comprises receiving at a machine learning algorithm the at least one earth model and at least one set of measurements stored within the central data repository.

16. The system of claim 15, wherein generating the at least one earth model comprises receiving from the machine learning algorithm at least one earth model generated, at least in part, from a user's input parameters to the machine learning algorithm.

17. The system of claim 14, wherein generating the completion design model comprises receiving at a machine learning algorithm at least one fracture design model and at least one set of measurements stored within the central data repository.

18. The system of claim 17, wherein generating the fracture design model comprises receiving from the machine learning algorithm the fracture design model generated, at least in part, from a user's input parameters to the machine learning algorithm.

19. The system of claim 14, wherein the identification of the optimized completion design comprises:
performing an uncertainty analysis with respect to the parameters of the subterranean formation and the parameters of the hydraulic fracturing operation based, at least in part, on parameters stored within the data repository;
determining a new value for at least one of the parameters of the subterranean formation and the parameters of the hydraulic fracturing operation based, at least in part, on the uncertainty analysis; and
simulating the hydraulic fracturing operation and fluid production from the subterranean formation following the hydraulic fracturing operation using the new value.

20. A method, comprising:
identifying parameters of a subterranean operation within a subterranean formation, wherein the subterranean operation may comprise a wellbore design operation, drilling operation or acid stimulation operation;
storing one or more measurements and the parameters of the hydraulic fracturing operation using a point and vector model in a column-oriented database, wherein each row of a table of the column-oriented database corresponds to the one or more measurements associated with a particular point, wherein the particular point is identified in an associated column of the table by a corresponding coordinate reference system coordinate, wherein each column of the table corresponds to a different type of the one or more measurements, and wherein each entry in the associated column comprises polar coordinates of an arrow corresponding to the one or more measurements at the particular point represented in a corresponding row of the associated column;
generating a completion design model based on the stored parameters of the subterranean operation;
storing the completion design model in a central data repository of models;
generating the central data repository of models, wherein the central data repository is based on previously generated models for one or more other subterranean formations having varying levels of uncertainty for an expected output;

reducing at least one of the varying levels of uncertainty for the expected output based on completion parameters, wherein the completion parameters are used to update the central data repository of models; and accessing the central data repository of models to predict results expected for a data set based at least in part on the completion parameters and on the previously generated models, wherein the results comprise a prediction as to a level of output for the dataset, further wherein the prediction results in an identification of an optimized completion design for the dataset.

21. The method of claim 20, further comprising:

performing an uncertainty analysis with respect to the parameters of the subterranean formation and the parameters of the subterranean operation based, at least in part, on parameters stored within the central data repository;

determining a new value for at least one of the parameters of the subterranean formation and the parameters of the subterranean operation based, at least in part, on the uncertainty analysis; and simulating the wellbore design operation, drilling operation or acid stimulation operation and fluid production from the subterranean formation following the wellbore design operation, drilling operation or acid stimulation operation using the new value.

* * * * *